United States Patent
Thackway et al.

(10) Patent No.: US 9,784,451 B2
(45) Date of Patent: Oct. 10, 2017

(54) D5/D5A DF-42 DOUBLE WALLED EXIT CONE AND SPLASH PLATE

(71) Applicant: Siemens Energy, Inc., Orlando, FL (US)

(72) Inventors: Richard L. Thackway, Oviedo, FL (US); Charalambos Polyzopoulos, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 354 days.

(21) Appl. No.: 14/525,279

(22) Filed: Oct. 28, 2014

(65) Prior Publication Data

US 2016/0116167 A1    Apr. 28, 2016

(51) Int. Cl.
| | |
|---|---|
| F23R 3/00 | (2006.01) |
| F23R 3/04 | (2006.01) |
| F02C 3/14 | (2006.01) |
| F23R 3/60 | (2006.01) |
| F01D 9/02 | (2006.01) |
| F23R 3/46 | (2006.01) |
| F23R 3/54 | (2006.01) |

(52) U.S. Cl.
CPC ................ *F23R 3/04* (2013.01); *F01D 9/023* (2013.01); *F02C 3/145* (2013.01); *F23R 3/002* (2013.01); *F23R 3/46* (2013.01); *F23R 3/60* (2013.01); *F05B 2260/20* (2013.01); *F05B 2260/203* (2013.01); *F05D 2240/35* (2013.01); *F05D 2260/231* (2013.01); *F23R 3/54* (2013.01); *F23R 2900/03043* (2013.01); *Y02T 50/675* (2013.01)

(58) Field of Classification Search
CPC .. F23R 3/002; F23R 3/60; F23R 2900/03043; F23R 3/54; F01D 9/023; F05B 2260/20; F05B 2260/203; F02C 3/145
See application file for complete search history.

(56) References Cited

U.S. PATENT DOCUMENTS

| | | | | |
|---|---|---|---|---|
| 6,832,482 B2* | 12/2004 | Martling | ................. | F23R 3/286 60/737 |
| 2007/0256417 A1* | 11/2007 | Parker | ...................... | F23M 5/00 60/748 |
| 2007/0258808 A1* | 11/2007 | Ohri | ....................... | F01D 9/023 415/139 |
| 2009/0282833 A1* | 11/2009 | Hessler | ................... | F23R 3/002 60/757 |

* cited by examiner

*Primary Examiner* — Pascal M Bui Pho
*Assistant Examiner* — Katheryn Malatek

(57) ABSTRACT

A combustor basket assembly for a gas turbine engine that includes a combustor basket having a basket liner including an input end and an output end. A double-wall exit cone is mounted to the output end of the basket liner, where the exit cone includes an inner wall and an outer wall defining an exit cone channel therebetween. A splash plate is mounted to the outer wall to define a splash plate channel between the splash plate and the basket liner. A series of pairs of cooling feed holes are provided through the basket liner, where one of the feed holes in each pair provides cooling air to the cone channel and the other feed hole provides cooling air to the splash plate channel. The outer surface of the outer wall and the inner surface of the inner wall are coated with a thermal barrier coating.

10 Claims, 3 Drawing Sheets

D5/D5A DF-42 DOUBLE WALLED EXIT CONE AND SPLASH PLATE

BACKGROUND OF THE INVENTION

Field of the Invention

This invention relates generally to a combustion basket assembly for a gas turbine engine, where the assembly includes a double-wall exit cone and a splash plate at an output end of the combustion basket and, more particularly, to a combustion basket assembly for a gas turbine engine, where the assembly includes a double-wall exit cone and a splash plate at an output end of the combustion basket, and where an array of pairs of cooling feed holes are provided that separately provide cooling air to the exit cone and the splash plate.

Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typical gas turbine engine includes a compressor section, a combustion section and a turbine section. The compressor section provides a compressed airflow to the combustion section where the air is mixed with a fuel, such as natural gas. The combustion section includes a plurality of circumferentially disposed combustors that receive the fuel to be mixed with the air and ignited to generate a working gas. The working gas expands through the turbine section and is directed across rows of blades therein by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because too high of a temperature can damage various parts and components in the turbine section of the engine. However, it is desirable to cause the temperature of the working gas to be as high as possible because the higher the temperature of the working gas, the faster the flow of the gas, which results in a more efficient operation of the engine.

In certain gas engine turbine designs, a portion of the compressed airflow is also used to provide cooling for certain components in the turbine section, such as the vanes, blades and ring segments. The more cooling and/or the more efficient cooling that can be provided to these components allows the components to be maintained at a lower temperature, and thus the higher the temperature the working gas can be. For example, by reducing the temperature of the compressed air, less compressed air is required to maintain the part at the desired temperature, resulting in a higher working gas temperature and a greater power and efficiency from the engine. Further, by using less cooling air at one location in the turbine section, more cooling air can be used at another location in the turbine section. In one known turbine engine design, 80% of the compressed airflow is mixed with the fuel to provide the working gas and 20% of the compressed airflow is used to cool the turbine parts. If less of that cooling air is used at one particular location as a result of the cooling air being lower in temperature, then more cooling air can be used at other areas for increased cooling.

In one known gas turbine engine design, a combustor basket is provided in each combustor of the engine, where the fuel and air are mixed together and ignited to generate a hot working gas. The hot working gas from the combustor basket flows into a transition component and is directed to the first row of vanes in the engine. It has been shown that some of the hot working gas that exits the combustor basket is caused to flow in a reverse direction and be directed towards an exit cone of the combustor basket, which sometimes causes burning of a downstream surface of the exit cone and a basket liner. It is known in the art to provide a splash plate between a single wall exit cone and the basket liner at the end of the combustion basket that prevents the hot working gas from directly impinging and burning the basket liner. The splash plate provides backside cooling to both the inner diameter surface and outer diameter surface of the basket, which allows both surfaces to be coated with a thermal barrier coating. Cooling flow is provided to the backside surface of the exit cone through cooling holes in the basket liner. However, the single wall exit cone still experiences heating distress. Particularly, the cooling air supply provided to the cooling holes in the basket liner is split between the splash plate and the exit cone, where the splash plate typically receives the majority of the cooling air. It is difficult to control the separation of the cooling air to the exit cone and the splash plate, where the exit cone could receive reduced cooling and increased distress.

SUMMARY OF THE INVENTION

The present disclosure describes a combustor basket assembly for a gas turbine engine. The assembly includes a combustor basket having a basket liner including an input end and an output end. A double-wall exit cone is provided at the output end of the basket liner, where the exit cone includes an inner wall and an outer wall defining an exit cone channel therebetween. A splash plate is mounted to the outer wall to define a splash plate channel between the splash plate and the basket liner. A series of pairs of cooling feed holes are provided through the basket liner, where one of the feed holes in each pair provides cooling air to the exit cone channel and the other feed hole provides cooling air to the splash plate channel.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a configuration of a double-wall exit cone and splash plate at an output end of a combustor basket in a gas turbine engine is merely exemplary in nature, and is in no way intended to limit the invention or its applications or uses.

Figure 1:
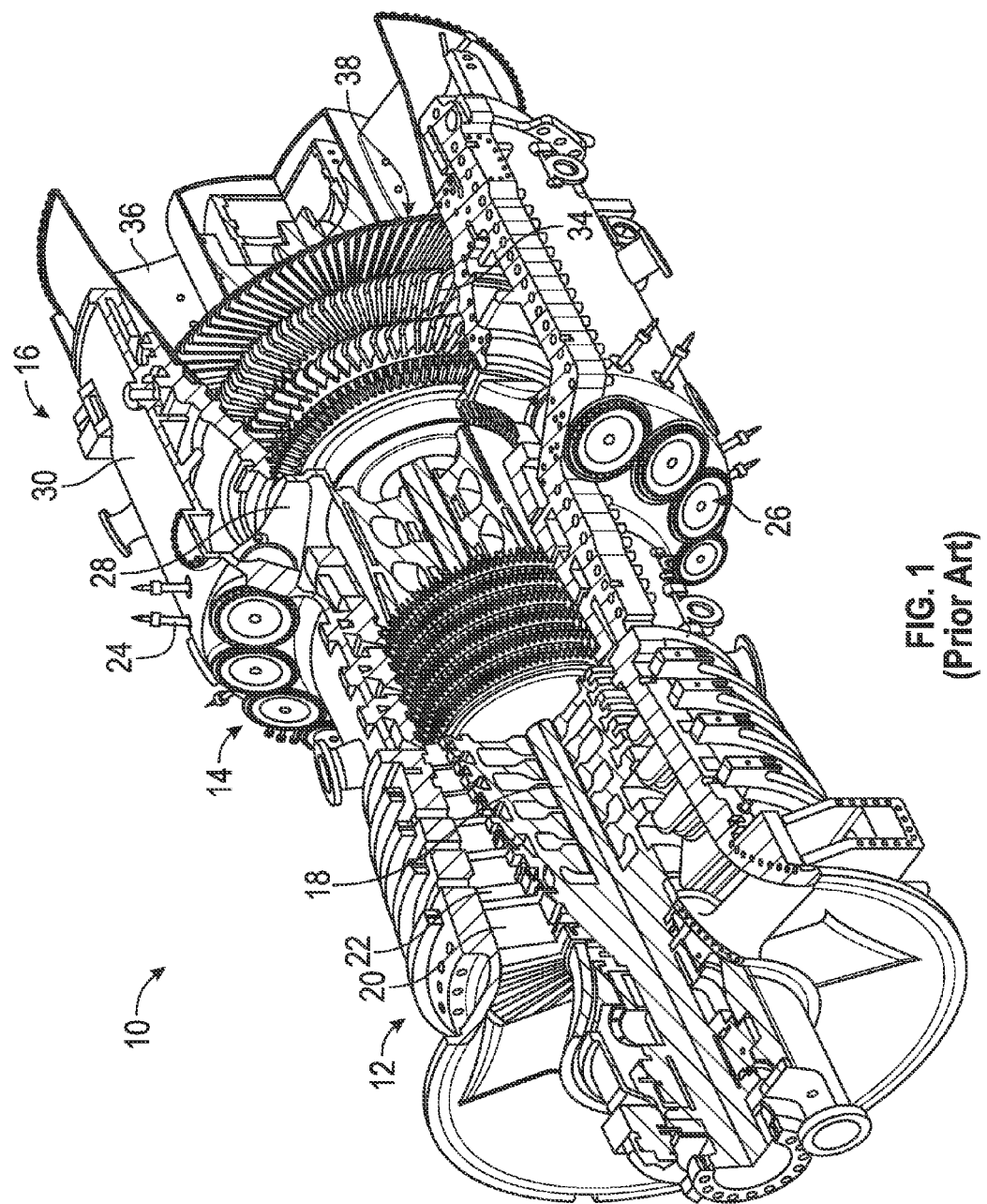
FIG. 1 is a cut-away, isometric view of a gas turbine engine.

FIG. 1 is a cut-away, isometric view of a gas turbine engine 10 including a compressor section 12, a combustion section 14 and a turbine section 16 all enclosed within an outer housing or casing 30, where operation of the engine 10 causes a central shaft or rotor 18 to rotate, thus creating mechanical work. The engine 10 is illustrated and described by way of a non-limiting example to provide context to the invention discussed below. Those skilled in the art will appreciate that other gas turbine engine designs can also be used in connection with the invention. Rotation of the rotor 18 draws air into the compressor section 12 where it is directed by vanes 22 and compressed by rotating blades 20 to be delivered to the combustion section 14, where the compressed air is mixed with a fuel, such as natural gas, and where the fuel/air mixture is ignited to create a hot working gas. More specifically, the combustion section 14 includes a number of circumferentially disposed combustors 26 each receiving the fuel that is injected into the combustor 26 by an injector (not shown), mixed with the compressed air and ignited by an igniter 24 to be combusted to create the working gas, which is directed by a transition component 28 into the turbine section 16. The working gas is then directed by circumferentially disposed stationary vanes (not shown in FIG. 1) in the turbine section 16 to flow across circumferentially disposed rotatable turbine blades 34, which causes the turbine blades 34 to rotate, thus rotating the rotor 18. Once the working gas passes through the turbine section 16 it is output from the engine 10 as an exhaust gas through an output nozzle 36.

Each group of the circumferentially disposed stationary vanes defines a row of the vanes and each group of the circumferentially disposed blades 34 defines a row 38 of the blades 34. In this non-limiting embodiment, the turbine section 16 includes four rows 38 of the rotating blades 34 and four rows of the stationary vanes in an alternating sequence. In other gas turbine engine designs, the turbine section 16 may include more or less rows of the turbine blades 34. It is noted that the most forward row of the turbine blades 34, referred to as the row 1 blades, and the vanes, referred to as the row 1 vanes, receive the highest temperature of the working gas, where the temperature of the working gas decreases as it flows through the turbine section 16.

Figure 2:
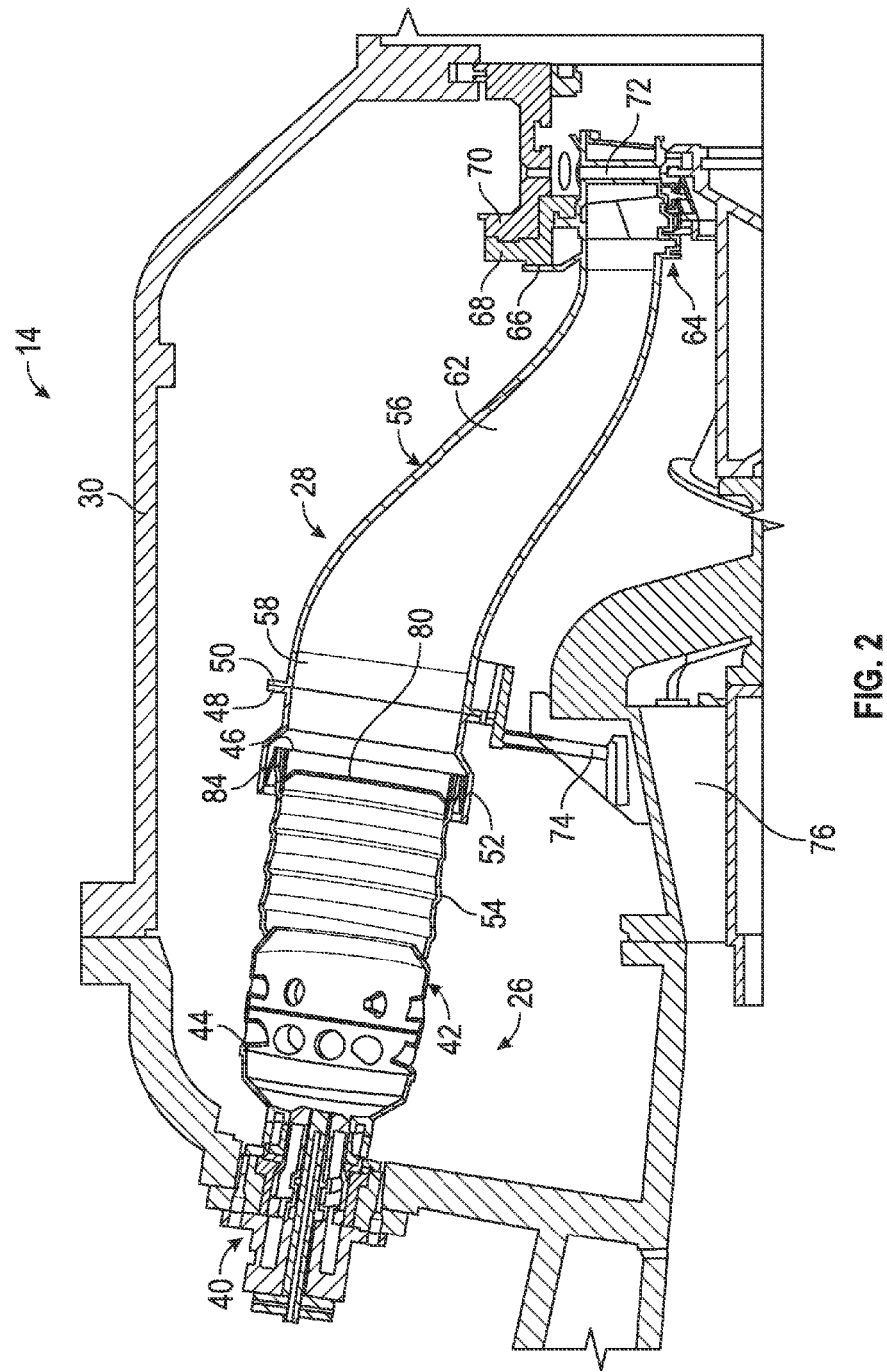
FIG. 2 is a cut-away, cross-sectional type view of a portion of a known combustion section for a gas turbine engine.
Figure 3:
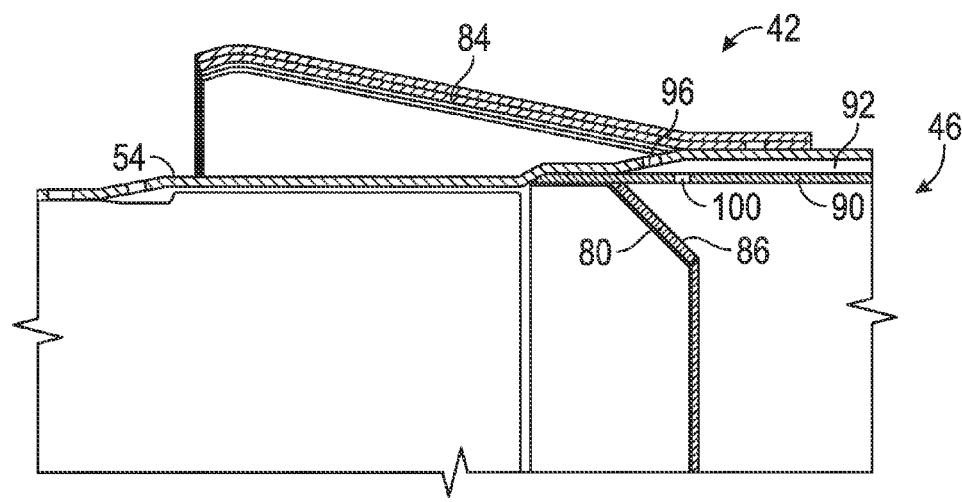
FIG. 3 is a cut-away, cross-sectional type view of the area at the end of the basket liner of the combustion section shown in FIG. 2.

FIG. 2 is a cut-away, cross-sectional type view of a portion of the combustion section of a gas turbine engine having a similar design to the gas turbine engine 10 and showing one of the combustors 26 and one of the transition components 28. The combustor 26 includes a nozzle section 40 through which the fuel is injected into a cylindrical combustor basket 42 in a controlled manner as is well understood by those skilled in the art. Air from the compressor section 12 enters the combustor basket 42 through circumferentially disposed openings 44, where the air/fuel mixture is ignited by the igniters 24 (see FIG. 1) to generate the hot working gas. The working gas flows through a cylindrical basket liner 54 that defines an enclosure of the basket 42 towards a basket exit 46 at an end of the basket 42 opposite to the nozzle 40. FIG. 3 is broken-away, cross-sectional type view of a portion of the output end of the basket 42. An annular exit cone 80 is provided within the basket liner 54 upstream from the basket exit 46 through which the hot working gas exits the basket 42. The end of the basket liner 54 is slid into a transition cylinder 52 having an annular mounting flange 48. A spring clip 84 is secured to an outside surface of the basket liner 54 at the basket exit 46 and provides spring force against the transition cylinder 52 to hold the basket 42 within the transition cylinder 52.

The transition component 28 includes an annular flange 50 at an input end that is mounted to the annular flange 48 of the transition cylinder 52. The transition component 28 also includes a curved transition section 56 extending from the flange 50 that includes an inlet ring portion 58 and defining an internal chamber 62. An end of the transition section 56 opposite to the flange 50 includes a seal 64 and a mounting flange 66 through which the working gas is output to the turbine section 16. The transition section 56 transitions from a circular opening at the input end of the component 28 to a rectangular opening at the output end of the component 28. The mounting flange 66 is mounted to a ring bracket 68 that is secured to a blade ring 70, all well known to those skilled in the art. The seal 64 of the transition section 56 is positioned adjacent to row 1 vanes 72 that receive and direct the hot gas to the row 1 blades. A mounting bracket 74 is mounted to the transition section 56, as shown, and to a compressor exit diffuser 76.

Analysis has shown that the exit cone 80 creates a recirculation zone within the area between the exit cone 80 and the basket exit 46 that causes hot gas to be recirculated back towards the combustor basket 42 and impinge a backside surface 86 of the exit cone 80. For the current combustor basket design, it is not possible to apply a thermal barrier coating (TBC) to the outer surface of the combustor basket 42 including the backside surface 86 of the exit cone 80 because that coating would insulate the basket 42 from cooling air provided to cool the basket 42. In order to address this problem, it is known in the art to provide an annular splash plate 90 mounted to the basket liner 54 within the basket exit 46, but outside of the exit cone 80, as shown, that defines a cooling channel 92 therebetween. A series of spaced apart cooling feed holes 96 are provided through the basket liner 54 at the basket exit 46 that receive cooling air flowing between the spring clip 84 and the basket liner 54 and into the channel 92. Further, a series of spaced apart feed holes 100 are provided in the splash plate 90 that allow the cooling air flowing through the feed holes 96 to also flow through the splash plate 90 and cool the exit cone 80. However, this creates a problem in that because the cooling air is fed to the exit cone 80 by the same feed holes that provide cooling flow to the splash plate 90, there is a reduction in the amount of cooling air that can be provided to the exit cone 80. This can be compensated for by increasing the size of the feed holes 96 and 100 for the cooling air, however, it is difficult to control the cooling air that is split between the exit cone 80 and the splash plate channel 92.

The present invention proposes a solution to this problem that allows all relevant surfaces of the basket liner 54, the basket exit 46 and the exit cone 80 to be provided with a thermal barrier coating, and also allows a controlled adjustment of cooling air supplied to the exit cone 80 and the splash plate 90.

Figure 4:
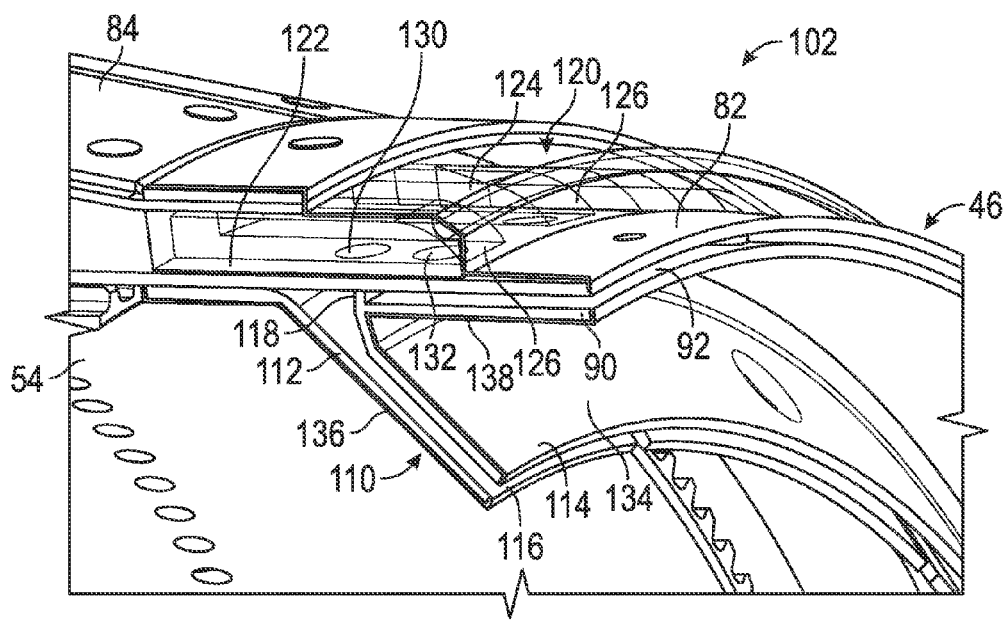
FIG. 4 is a cut-away, isometric view of a portion of a double-wall exit cone and splash plate at an output end of a combustor basket liner of a gas turbine engine.

FIG. 4 is a broken-away, isometric view of a portion of an output end of a combustor basket 102 according to the proposed design, where like elements to the discussion above are shown by the same reference number. In one design change, the exit cone 80 is replaced with a double-wall exit cone 110 including an inner cone wall 112 and an outer cone wall 114 defining an annular channel 116 therebetween, where both of the walls 112 and 114 are mounted to the basket liner 54 at the basket exit 46, as shown. The outer cone wall 114 includes a barrier wall portion 118 that engages an end of the splash plate 90 and the basket liner 54. Another design change includes providing an extended spacer ring 120 mounted to an outside surface of the basket liner 54 at the basket exit 46, where the spring clip 84 is secured to an outside surface of the spacer ring 120, as shown. The spacer ring 120 includes outer walls 122 that define an enclosure and inner walls 124 that define a series of parallel flow channels 126 within the enclosure. Cooling air flowing between the spring clip 84 and the basket liner 54 flows into and through the flow channels 126. In an alternate embodiment, the spring clip 84 can be secured to the basket liner 54 farther up or down stream from the position shown, where the spacer ring 120 can be eliminated.

A series of spaced apart pairs of adjacent feed holes 130 and 132 are formed through the bottom wall of the spacer ring 120 and are aligned with cooperating feed holes (not shown) in the basket liner 54. The feed holes 130 and 132 are positioned on opposite sides of the barrier wall portion 118 of the outer exit cone wall 114, where the holes 130 are in fluid communication with the channel 116 between the exit cone walls 112 and 114, but not the channel 92, and the holes 132 are in fluid communication with the channel 92, but not the channel 116. The holes 130 and 132 are properly metered, i.e., have a certain relative size, so that the desired amount of cooling air is provided to the exit cone 110 and the desired amount of cooling air provided to the splash plate 90, where the barrier wall portion 118 prevents the cooling air from combining. Thus, in this design, an outer surface of the exit cone wall 114 and an inner surface of the exit cone wall 112 that are not exposed to the cooling air have a thermal barrier coating 134 and 136, respectively, that helps prevent those components from being burned by the hot working gas.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A combustor basket assembly for a combustor in a gas turbine engine, said combustor basket assembly comprising:
   a combustor basket including a basket liner having an input end receiving air and fuel and an output end through which a hot working gas exits the combustor basket, said combustor basket further including a double-wall exit cone coupled to the basket liner at the output end, said double-wall exit cone including an inner cone wall and an outer cone wall defining an annular exit cone channel therebetween, each of the inner cone wall and the outer cone wall including an inner surface and an outer surface, where the outer surface of the inner cone wall and the inner surface of the outer cone wall face the annular exit cone channel, said combustor basket further including a splash plate mounted to the outer wall and extending parallel to the output end of the basket liner so as to define an annular splash plate channel therebetween, wherein the outer cone wall is attached to the combustor basket so as to allow a cooling air to be split between the double-wall exit cone and the splash plate;
   a plurality of pairs of adjacent cooling fluid feed holes provided in the basket liner and circumferentially disposed around the output end of the basket liner so that one of the feed holes in each of the plurality of pairs of adjacent cooling fluid feed holes is in fluid communication with the annular exit cone channel and is prevented from being in fluid communication with the annular splash plate channel and the other feed hole in each of the plurality of pairs of adjacent cooling fluid feed holes is in fluid communication with the annular splash plate channel and is prevented from being in fluid communication with the annular exit cone channel, and
   a spacer ring mounted to an outer surface of the output end of the basket liner and including a plurality of internal channels that provide the cooling air to the plurality of pairs of adjacent cooling fluid feed holes.

2. The combustor basket assembly according to claim 1, wherein the annular exit cone channel cooling air and the annular splash plate channel cooling air are prevented from being in fluid communication with each other by a barrier wall portion that is part of the outer cone wall.

3. The combustor basket assembly according to claim 1 further comprising an annular spring clip mounted to an outer wall of the spacer ring, said annular spring clip allowing the cooling air to flow to the spacer ring.

4. The combustor basket assembly according to claim 1 wherein the inner surface of the inner cone wall and the outer surface of the outer cone wall are coated with a thermal barrier coating.

5. The combustor basket assembly according to claim 1 wherein an inner surface of the splash plate facing the outer surface of the outer cone wall is coated with a thermal barrier coating.

6. A combustor basket assembly for a combustor in a gas turbine engine, said combustor basket assembly comprising:
   a combustor basket including a basket liner, said combustor basket further including a double-wall exit cone coupled to an output end of the basket liner, said double-wall exit cone including an inner cone wall and an outer cone wall defining an annular exit cone channel therebetween, each of the inner cone wall and the outer cone wall including an inner surface and an outer surface, where the outer surface of the inner cone wall and the inner surface of the outer cone wall face the annular exit cone channel; and
   a splash plate mounted to the outer cone wall and extending parallel to the output end of the basket liner so as to define an annular splash plate channel therebetween,
   a plurality of pairs of adjacent cooling fluid feed holes provided through the basket liner and circumferentially disposed around the output end of the basket liner so that one of the feed holes in each of the plurality of pairs of adjacent cooling fluid feed holes is in fluid communication with the annular exit cone channel and is prevented from being in fluid communication with the annular splash plate channel and the other feed hole in each of the plurality of pairs of adjacent cooling fluid feed holes is in fluid communication with the annular splash plate channel and is prevented from being in fluid communication with the annular exit cone channel, and
   a spacer ring mounted to an outer surface of the output end of the basket liner and including a plurality of internal channels that provide an annular exit cone channel cooling fluid and an annular splash plate channel cooling fluid to the plurality of pairs of adjacent cooling fluid feed holes, respectively.

7. The combustor basket assembly according to claim 6 wherein the inner surface of the inner cone wall and the outer surface of the outer cone wall are coated with a thermal barrier coating.

8. The combustor basket assembly according to claim 6 wherein an inner surface of the splash plate facing the outer surface of the outer cone wall is coated with a thermal barrier coating.

9. The combustor basket assembly according to claim 6 wherein the annular exit cone channel cooling fluid and the annular splash plate channel cooling fluid are prevented from being in fluid communication with each other by a barrier wall portion that is part of the outer cone wall.

10. The combustor basket assembly according to claim 6 further comprising an annular spring clip mounted to an outer wall of the spacer ring, said annular spring clip collecting and providing the annular exit cone channel cooling fluid and the annular splash plate channel cooling fluid to the spacer ring.

* * * * *